United States Patent [19]

Luce

[11] 4,044,596
[45] Aug. 30, 1977

[54] VOLUMETRIC METER

[76] Inventor: Yves Luce, 1 bis rue Rabelais, 93100 Montreuil, France

[21] Appl. No.: 707,685

[22] Filed: July 22, 1976

[30] Foreign Application Priority Data

Aug. 11, 1975 France .................................. 75.24928

[51] Int. Cl.² ............................................... G01F 1/07
[52] U.S. Cl. ....................................... 73/260; 418/257
[58] Field of Search ................... 73/260; 418/253, 257, 418/259, 260, 265

[56] References Cited

U.S. PATENT DOCUMENTS

| 822,343 | 6/1906 | Cagle | 418/260 X |
| 2,720,191 | 10/1955 | Vas | 73/260 X |
| 3,088,529 | 5/1963 | Cullen | 418/257 X |
| 3,523,455 | 8/1970 | Branitzky | 73/258 |

FOREIGN PATENT DOCUMENTS 13,943 of 7/1893 United Kingdom ................... 73/260

Primary Examiner—James J. Gill

[57] ABSTRACT

This volumetric meter comprises a case with at least one inlet orifice and at least one outlet orifice interconnected by a circular passage concentric to an annular member rotatably mounted therein and provided with collapsible spaced peripheral vanes so arranged that at any time there are constantly two adjacent vanes in their spread position retaining in said passage between them a constant amount of liquid. (FIG. 2).

1 Claim, 3 Drawing Figures

VOLUMETRIC METER

So-called "turbine" meters are know which comprise a case or body in which at least one inlet orifice and at least one outlet orifice are formed, the fluid flowing from one inlet orifice to one outlet orifice along a circular internal passage in which the ends of radial vanes are caused to extend without blocking said passage, said vanes being rotatably driven by the internal circular fluid circulation.

Said radial vanes are thus caused to rotate a central shaft driving in turn a counter recording the number of revolutions of said shaft and consequently the output of the liquid flowing through the meter cavity.

These so-called "turbine" meters are of the speedmeter type for they do not record the volume of the passing or flowing liquid, since they record only the passage or flow velocity thereof. In addition, their axial operation is extremely flexible and insensitive to a maximum number of r.p.m. during their rotation.

Volumetric meters are also known which comprise a case in which an inlet orifice or post and an outlet orifice or port for the liquid are formed, together with an circular internal passage along which the liquid is caused to flow with the assistance of cavities formed in a member disposed across said passage and moving along a circular path in said passage while rotating eccentrically in the meter body.

This eccentric rotary motion requires, at high rotational speeds, a limitation of this rotation to a r.p.m. value consistent with the throw of the rotary member.

Now these volumetric meters are of the so-called "leakage" type, but this is immaterial for the leakage value is extremely low and constantly the same for each revolution of the central shaft; therefore, the recording apparatus or instrument may be adapted to take due account of said leakage.

It is the primary object of the present invention to combine the flexibility of the so-called "speed-meter" having a central rotational axis with the volumetric precision afforded by the "leakage" meter, without having the above-mentioned inconveniences of limiting the rotational speed, due to the presence of a member operating eccentrically or with an oscillatory motion in relation to the axis of the meter; more particularly, this invention provides a volumetric meter comprising a case in which at least one inlet orifice and at least one outlet orifice are formed, and therebetween a circular internal passage along which the liquid is caused to flow from said inlet orifice to said outlet orifice while driving the outer ends of radial vanes, this meter being characterized in that said radial vanes form and trap therebetween, in said passage, a predetermine volume of liquid, and that said case consists of a pair of adjacent chambers separated by a transverse partition through which the liquid cannot flow during its travel from the inlet orifice to the outlet orifice, through a window provided for this purpose in said transverse partition, unless the liquid has actually flowed through said passage.

According to another feature characterizing this invention, the central shaft is rotatably driven by pivoted vanes adapted to move from a retracted position towards the center to an expanded or operative position in which they block the aforesaid passage, in combination with means for automatically and successively spread, retain and retract said vanes during each revolution, so that at least two adjacent vanes constantly project into said passage between the inlet and outlet thereof.

The attached drawing illustrates diagrammatically two exemplary forms of embodiment of the present invention.

Figure 1:
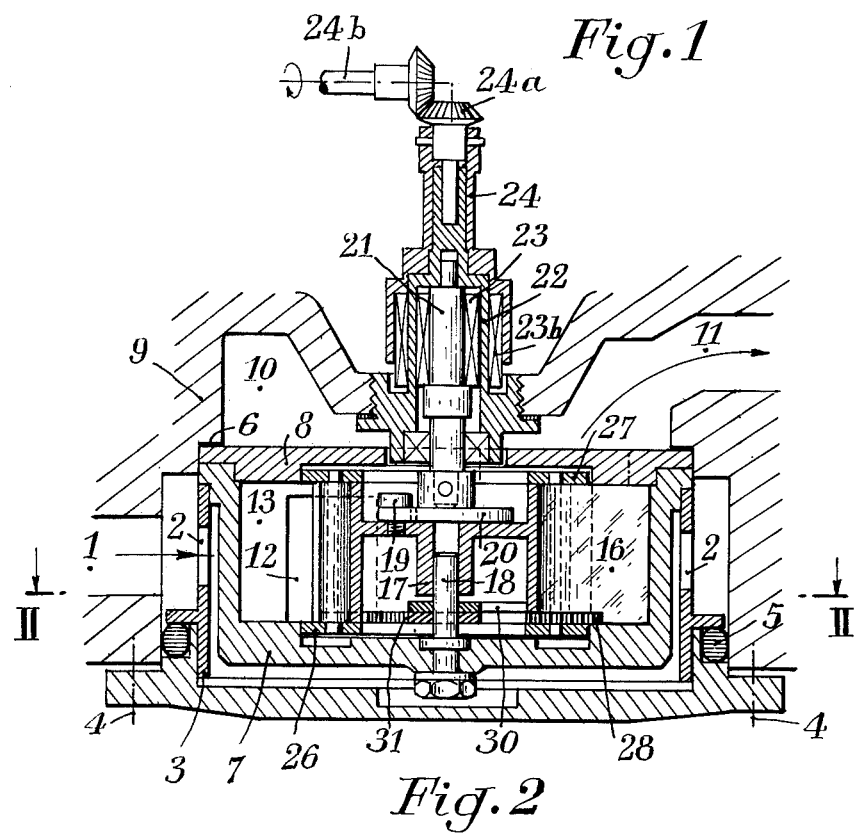
FIG. 1 is an axial cross-sectional view of the apparatus.

The liquid penetrating into the case of the meter-through an inletport 1 flows through the orifice 2 formed in a socket 3 which, with the assistance of bolts 4 and seals 5, 6 secures the body 7 and the transverse partition 8 to the member 9 limiting the top of the chamber 10 from which the liquid can escape through the outlet orifice or port 11.

Preliminary to flowing into said chamber 10 and out through port 11, the liquid is compelled to flow through the opening 12 formed in said body 7 under the transverse partition 8, and along the circular passage 13 opening under a port 15 formed in said transverse partition 8 and leading to the upper chamber 10.

During its circulation in said passage 13, the liquid impinging the vanes 16 causes the rotation of a member 17 mounted for loose rotation on a central shaft 18. This member 17 is secured by a screw 19 to a circular flange 20 also rigid with a rod 21 enclosed in a fluid-tight bellshaped member 22, said rod 21, being adapted, via magnetic members 23a and 23b, disposed internally and externally of the bell-shaped member 22, respectively, rotatably to drive the external member 24 adapted in turn, via bevel gears 24a, to drive the shaft 24b of a revolution counter.

The vanes 16 are pivotally mounted on their pins 25 between the lower and upper washers 26, 27 respectively, and adapted to either collapse completely within said member 17 or emerge therefrom to block completely the passage 13.

These vanes 16 are four in number and rotatably rigid with toothed circular segments 28 meshing with racks 29 formed on diametral slides 30 and 31 disposed at right angles to each other, whereby the spreading of one vane is controlled by the retraction of the conjugate vane. Furthermore, a cam face 42 provided at the end of said passage 13 controls the collapse of a vane 16a where the latter brings across the port 15 of the intermediate partition 8, through said passage 13, the amount of liquid bounded in said passage by this vane 16a and by the following vane.

Figure 2:
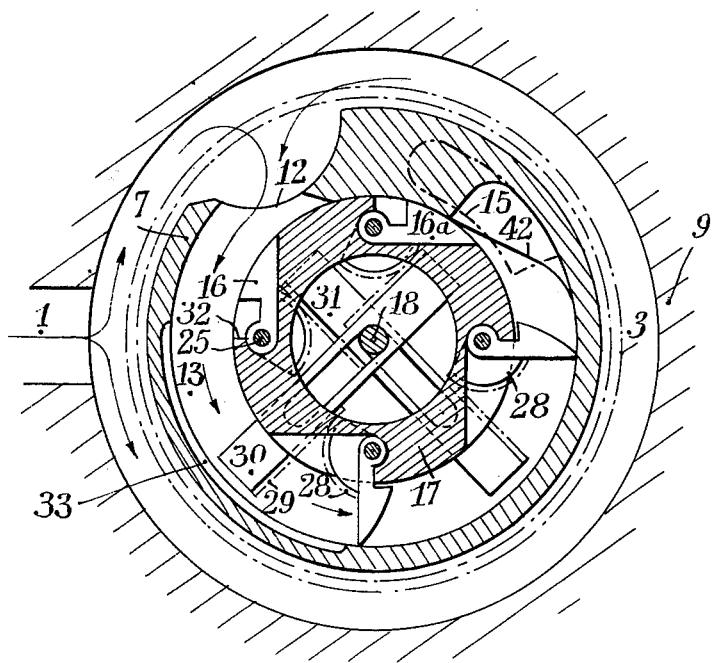
FIG. 2 is a cross section taken along the line II—II of FIG. 1.

Thus, as illustrated in FIG. 2, at any time there are constantly two fully-spread vanes and simultaneously two other vanes collapsed within the member 17, the spreading of said vanes being limited in the radial position by their engagement with shoulders 32 of said member 17.

To facilitate the successive spreading of each vane 16, a slightly widened portion 33 of passage 13 is provided in the area of said passage where this spreading movement takes place, so that the liquid can flow freely around the vanes during the spreading thereof.

Figure 3:
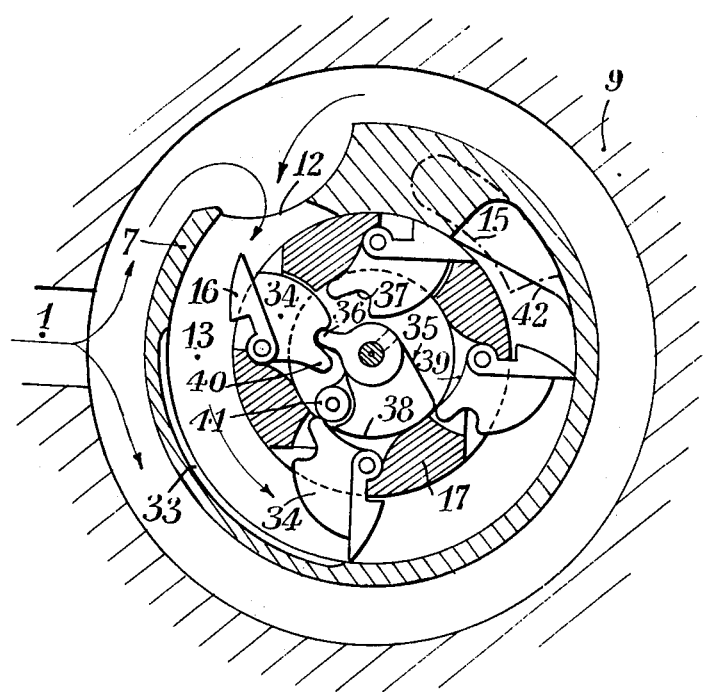
FIG. 3 illustrates a view similar to FIG. 2 concerning a modified form of embodiment.

The form of embodiment illustrated in FIG. 3 differs from the one shown in FIG. 2 only by the manner in which the spreading and retraction of said vanes 16 are controlled.

In this modified construction each vane 16 is rigid with a cam 34 substituted for the toothed segments 28 and co-acting with a fixed cam member 35; the latter comprises a nose portion 36 co-acting with a groove 37 formed in the movable cam member 34 for starting the outward movement of the vanes 16, and a circular contour 38 co-acting with a circular contour 39 of the movable cam in order to keep the vanes 16 in their spread position.

When the outward movement of vanes 16 has begun, as a consequence of the combined action of nose 36 with groove 37, this movement takes place smoothly, without any shock and wear, the heel 40 of cam 34 engaging roller 41 mounted for loose rotation on a pin.

This modified structure operates exactly like the preceding form of embodiment.

Of course, the two forms of embodiment of the invention which are described hereinabove and illustrated in the attached drawing should not be construed as limiting the scope of the invention since many modifications and changes may be brought thereto without departing from the basic principles of the invention; thus, notably, the number of vanes may be other than four, and a plurality of similar or different circular passages may be provided for increasing the output measured for each revolution of the central shaft, and the means for controlling the vane movements may differ from those contemplated heren, as will readily occur to those skilled in the art.

What is claimed as new is:

1. Volumetric meter for measuring the output of a liquid flowing therethrough, which comprises a case having at least one aperture formed therein for introducing the liquid of which the output is to be measured, at least one liquid outlet aperture, and an inner circular channel connecting one inlet aperture to one outlet aperture, said liquid being led to flow through said channel for circulating from said at least one inlet aperture to said at least one liquid outlet aperture, a central member concentric to said circular channel which bounds internally said channel and is mounted for free rotation in said case, at least two pairs of diametrally opposite vanes pivotally mounted on, and rotatably rigid with, said central member, said vanes being distributed at spaced intervals on, and mounted at the outer periphery of, said central member between a first end position in which said vanes are retracted towards the center and another end position in which said vanes are spread radially outwards so as to close said channel in this other end position, said vanes being normally urged to said other end position by the pressure of the liquid stream flowing through said channel, and wherein each pair of successive vanes form therebetween in said channel, between one inlet aperture and one outlet aperture of said channel, a predetermined volume of liquid of which the output is to be measured, means for positively controlling the return of each previously spread vane to its retracted position after the vane concerned, during its pivotal movement in said channel, has bounded with the next following vane said predetermined volume of liquid, a diametral slide, rigid with said central member, operatively associated with each pair of diametrally opposite vanes, a toothed circular segment rotatably rigid with, and coaxial to, each vane, and a rack at either end of each diametral slide, each rack being in constant meshing engagement with the circular toothed segment of the associated vane, whereby the retraction of one towards the center of the meter will control the radial spreading of the diametrically opposite vane, said vice versa, and a shaft coaxial to and rotatably rigid with said central member, each revolution of said shaft corresponding to a predetermined output of the liquid flowing through said meter.

* * * * *